Dec. 26, 1950     C. E. SWENSON     2,535,878
DUSTPROOF BEARING FOR SICKLES
Filed Sept. 16, 1947

INVENTOR.
Carl E. Swenson
BY
McCanna and Morsbach
ATTYS.

Patented Dec. 26, 1950

2,535,878

UNITED STATES PATENT OFFICE 2,535,878

DUSTPROOF BEARING FOR SICKLES

Carl E. Swenson, Rockford, Ill.

Application September 16, 1947, Serial No. 774,218

12 Claims. (Cl. 56—299)

This invention pertains to mowing machines for agricultural and other purposes and, more particularly, to the cutter mechanisms of such machines wherein the cutter has a single moving blade although the machine may carry a plurality of such blades for such use as where cutting a number of rows of stalks of corn at one time.

Where for any reason a green or dry row crop such as corn is to be harvested by cutting the plant or plant stalk, especially where the cut is to be made close to the soil, it is inevitable that the ordinary reciprocatory cutting blade, the blade guides of the cutter bar and the blade operating mechanism will become fouled with and damaged by dirt and other debris encountered in the process. While little can be done to prevent dulling of the cutting edges of the blade beyond providing the usual guard on the stationary teeth or shear blades, resharpening or replacing the blade being of minor difficulty and expense, a very real and serious problem is presented when dirt enters and stoppage occurs or the dirt fouls and wears the reciprocatory blade carrier, the blade guideways and other parts of the cutter bar and its operating mechanism. Wear and other damage to such parts will permit the blade to wobble or otherwise to malfunction with the result that the cutter becomes inoperative properly to perform its purpose. Repair or replacement of expensive parts becomes necessary and time lost may be even more costly.

Accordingly, one of the primary objectives of the invention is to provide a cutter bar blade mounting and operating mechanism of such construction and arrangement that those parts will be protected from dirt and other debris and will have long life.

Another and concurrent difficulty experienced with cutters of the prior types of construction above mentioned is that of maintenance of proper lubrication. Cutter blade carriers reciprocating in open slots or guideways in cutter bars must be lubricated with relatively heavy greases or lubricated more frequently if light lubricants are used. However, in neither case does the lubricant serve its purpose very satisfactorily and in either event dirt and other debris is gathered in and retained by the lubricant itself which then may serve to do more damage than good.

Therefore, it is another important object of the invention to provide a cutter mechanism which not only will prevent dirt from entering and wearing or otherwise damaging the working parts but which will avoid the necessity of frequent lubrication or the use of heavy greases and which will serve as a self-feeding lubricant reservoir requiring replenishment only after a long period of use.

A still further object is to provide a more efficient and effective plant cutting operation by so mounting, arranging and operating the cutter blades that the relative movements between the blades will produce a "slicing" action as well as the ordinary "shearing" action.

Another object of the invention is the provision of a sickle in which the movable cutter blade is readily removable for replacement and repair, and is readily adjustable in the field for close shearing contact with the complementary cutter elements.

Other objects as well as the several advantages and many adaptations and uses of the invention will be or should become apparent after reading the following description and claims and after viewing the drawing, in which:

Figure 1:
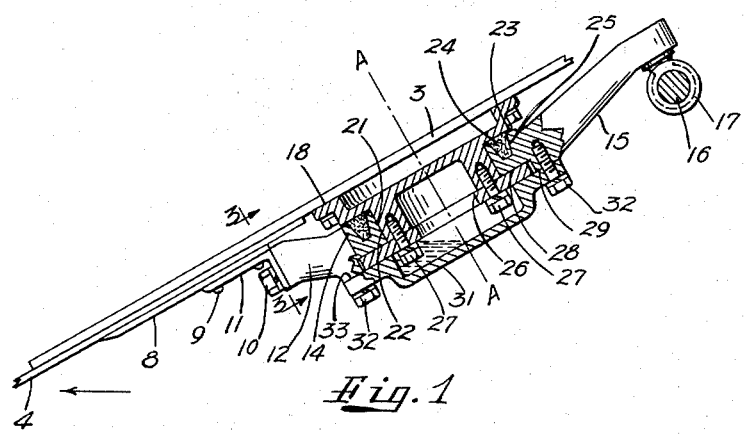
Figure 1 is a side elevation, with portions in section and parts broken away, of a preferred form of the invention as applied to a corn stalk cutter.
Figure 2:
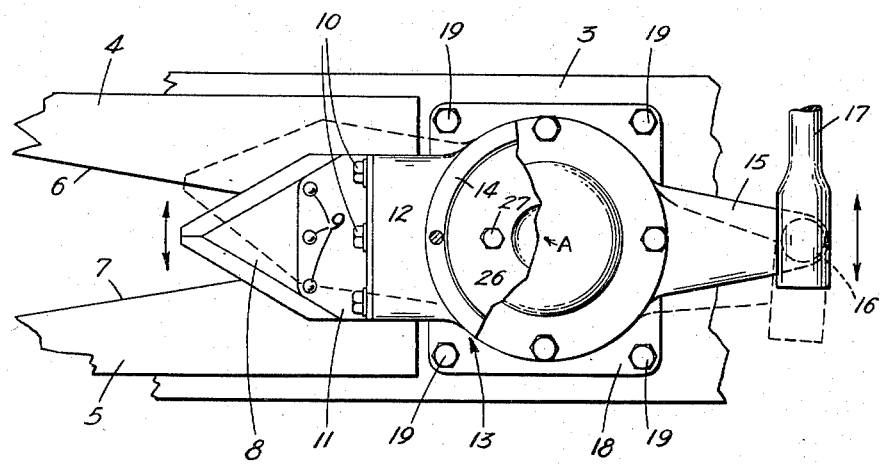
Fig. 2 is a bottom plan view of the device of Figure 1.

The corn stalk cutter shown in the drawings is an individual blade device for attachment to a stalk harvesting machine which may include a stalk chopping or comminuting mechanism whereby the stalks (and leaves), after the stalks have been cut down, may be chopped up into small pieces for use as stock feed, bedding (if dry) and other uses. Where corn borer infestation is bad it is desirable to cut the stalks close to the plant roots or, at ground level, and thereafter to shred, crush, grind, chop or otherwise comminute or reduce the plant remains thereby to destroy any borer larvae or pupae which may be active or hibernating therein, the borer in the larval or pupal state usually remaining in the stalk in which it was reared. Cutters or mowers so used, that is, for cutting the stalks close to the ground or soil, are especially subject to damage and a very high rate of wear, as will be appreciated, for which reason protection from dirt and assurance of proper lubrication become major problems.

The cutter illustrated is carried by a machine (not shown) which may also supply the power by which to operate the cutter blade, the cutter being attached to the machine through the medium of a support plate or member 3 which may be adjustable in a plurality of directions for the purpose of setting the plane of the cutter blades, i. e., the moving blade and the shear or guide blades at different angles and at different elevations with respect to the surface of the terrain. In the illustrated embodiment the cutter blades are inclined at an angle of about 35° to a horizontal plane with the plane of the blade intercepting a vertical plane that is perpendicular to the direction of forward motion of the machine (direction shown by the arrow in Figure 1) in a horizontal line. The purpose of this blade inclination or setting is to effect shearing of plants on a bevel or incline.

Securely attached to the support plate or member 3 are a pair of stationary teeth or shear blades 4 and 5 the inner or adjacent edges 6 and 7 of which are spaced a substantial distance apart at their forward portions (broken away) and converge toward one another from a forward position toward a rearward position. These stationary teeth or shear blades may be formed as individual and separate elements or as one piece but in either case the edges 6 and 7 provide a tapered guide slot down which plant stalks are guided into engagement with the double edged moving knife or blade 8 which effects the cutting operation. The blade 8, is of somewhat triangular shape in plan view with its apex pointed forward and its base firmly connected, as by rivets 9 to an angle plate 11 which is connected with operating means to be described. Blade 8 presents a flat upper face to flat bottom faces of blades 4 and 5 and as these faces lie substantially parallel to one another and as there is slight clearance between the top face of blade 8 and the bottom faces of the others, under normal conditions, both cutting and shearing effects may be obtained simultaneously.

Figure 3:
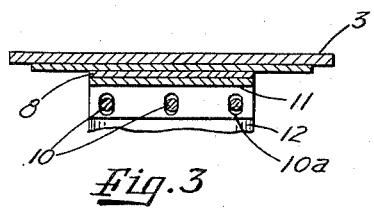
Fig. 3 is a sectional view along the line 3—3 of Figure 1.

Angle plate 11 carrying blade 8 is adjustably or otherwise secured to a projection or arm 12 by a plurality of cap screws 10 (Fig. 3) which pass through slots 10a in the bracket 11 permitting adjustment of the blade 8 with respect to the blades 4 and 5 to permit adjustment of the shearing action. The arm 12 projects from one side of a blade carrier and operating member generally designated 13, the center portion 14 which is of ring or annulus shape and which has a second projection or arm 15 connected through a pin or a ball and socket joint 16 with a reciprocatory drive rod 17 in turn reciprocated by any suitable power mechanism. The ring or annulus center portion 14 is pivotally mounted upon a hollow central stud or post 20, a pivot bearing member 18 which is fixedly secured, as by studs 19, to the under or bottom side of supporting member 3 from which it depends downwardly and rearwardly of the cutter blades. The arrangement is such that upon reciprocatory actuation of drive rod 17, the blade carrier will be oscillated on the pivot bearing thereby oscillating or swinging the blade 8 back and forth across the slot between relatively stationary blades 4 and 5.

In the illustrated embodiment the inner surface 21 of the bore of the carrier ring 14 and the outer surface 22 of the post 20 of pivot bearing member 18 which form the pivot bearing are cylindrical and have a rotating fit with one another circumferentially of a pivot axis A—A, but of course, could be tapered or conical surfaces with the base up and apex down, if desired. At the upper end of the cylindrical bearing surface 22 is a circumferential surface 23 also concentric with the axis A—A. A packing ring 24 of felt or other suitable material is disposed in a circumferential groove 25 formed in the upper side edge of annulus 14 and normally makes a dust-tight engagement or seal with the surface or shoulder 23 completely thereabout. The packing ring may also carry lubricant and act as a lubricant seal.

The annulus or carrier pivot ring 14 is held on its pivot by a thrust plate or ring 26 which is secured to the outboard end of the pivot post 20 as by stud bolts 27 and has its circumferential rim extending radially outward of axis A—A beyond the cylindrical bearing surface 22 and over and against a circumferential shoulder 28 cut in the lower side edge of the annulus 14. The surface of shoulder 28 serves as a thrust bearing surface cooperative with the upper surface of plate or ring 26. The outer circumferential edge surface of ring 26 may also serve as a bearing surface for a cooperative circular surface of annulus 14 effected in forming (cutting) the shoulder 28, these two surfaces being jointly indicated by reference character 29.

The outer marginal part of the lower side edge face of annulus 14 provides a circumferentially extending marginal surface substantially flush with the outer (lower) surface of plate or ring 26 against which the corresponding rim face surface of a combined cover and lubricant reservoir 31 is disposed and secured as by stud bolts 32. The line of engagement of the marginal surface of annulus 14 and the rim face surface of cover 31 is indicated at 33. The rim face surface of cover 31 not only makes circumferential contact with said marginal surface of annulus 14 (a gasket may be interposed between these surfaces if desired) but similarly has thrust bearing contact with thrust ring or plate 26 circumferentially of the latter and for a substantial distance radially inward thereof, this latter contact being a bearing or sliding one to permit relative rotation between these surfaces.

The cover 31 may serve alone to retain the thrust ring or plate 26 in which case the stud bolts 27 could be omitted but the construction illustrated is preferred. The cover 31 is provided with a central well or depression (thereby is cup-shaped) to provide a lubricant reservoir which may be charged with lubricant either by removal of the cover or by any suitable type of lubricant supply fitting and conduit to the interior of the cover. In Figure 1 a lubricant charge is indicated with the top level thereof above the highest edge of the cover rim (at the low side) so that lubricant will flow to and over and between all bearing surfaces and be carried by capillary action and working of the parts up to and including the pivot bearing surfaces.

The mounting construction above described prevents dust and other dirt from entering between the working surfaces, insures proper lubrication and a minimum of wear therefore maintenance of accuracy of operation and long life, and eliminates the many objectionable features of the prior reciprocating parts of a cutter bar. In addition to these several improvements and their advantages, the oscillating or swinging of the movable blade in an arc relative to the stationary shear blades or plant guides and the narrowing slot between the latter blades, has mechanical advantage over a like cutting blade which moves in a straight or linear path across the slot, for the reason that it effects both a "slicing" and a "shearing" action as distinguished from a mere "shearing" action alone. Furthermore, the angle between each of the moving blade cutting edges and the adjacent shear or guide edge of the adjacent stationary blade is reduced as the moving blade shifts from one end of its movement toward the shear or guide edge of that stationary blade with which it next cooperates. This arrangement makes for faster and better cutting.

While I have illustrated and described what, at present, is a preferred embodiment of the invention, it will be apparent that the invention is susceptible of other embodiments and that many changes and variations may be made in any form thereof without departing from the invention spirit and the scope of the appended claims.

I claim:

1. In a cutter of the character described for a harvesting machine, the combination of a relatively stationary pair of inwardly converging shear guides disposed in a plane providing a slot between them and a cutter blade mounted adjacent to the inner portion of the slot for movements in a plane independent of the plane of the shear guides across the slot and transversely of said guides, with a pivot member including a pivot bearing in fixed relation with the shear guides, a pair of opposed thrust bearings at one end of said pivot bearing, a blade carrier including a pivot ring portion mounted on said pivot bearing, said ring portion having a bearing surface engageable with one of said thrust bearings to prevent movement of the blade away from the shear guides, and a dust tight closure member rigidly attached to said blade carrier for enclosing the outer end of said pivot bearing and having a bearing surface engageable with the other thrust bearing to prevent movement of the blade toward the shear guides.

2. In a cutter of the character described for a harvesting machine, the combination of a relatively stationary pair of inwardly converging shear guides in a fixed plane providing a slot between them and a cutter blade mounted adjacent to the inner portion of the slot for movement in a fixed plane adjacent the plane of the shear guides and independent thereof across the slot and transversely of said guides, with a relatively fixed pivot member including an annular surface and a pivot bearing rigid with the shear guides and concentrically arranged with said annular surface, a pair of opposed thrust bearings adjacent one end of said pivot bearing, a blade carrier including a pivot ring portion mounted on said pivot bearing, dust tight closure means attached to said blade carrier and enclosing the outer end of said pivot bearing, bearing means on said carrier and closure means engaging said thrust bearings for positively maintaining said cutter blade in its fixed plane, said pivot ring having a circumferentially extending recess adjacent to said annular surface, and dust sealing material disposed circumferentially in said recess for wiping contact with said annular surface to prevent the entrance of dirt to said bearings.

3. In a cutter of the character described for a harvesting machine, the combination of a relatively stationary pair of inwardly converging shear guides in a plane providing a slot between them and a cutter blade in an independent plane adjacent the plane of the shear guides mounted adjacent to the inner portion of the slot for movements across the slot and transversely of said guides, with a relatively fixed pivot member including a substantially cylindrical pivot bearing, a pair of opposed thrust bearings, a blade carrier including a pivot ring portion mounted on said pivot bearing and spaced bearing means engageable respectively with said thrust bearings to positively maintain said cutter blade in said independent plane, and dust tight means providing a lubricant reservoir attached to said blade carrier and enclosing the outer end of said pivot bearing.

4. In a cutter of the character described for a harvesting machine, the combination of a support, means defining a plant guide slot having inwardly converging side walls disposed in a common plane and a cutter blade disposed in an independent plane adjacent the plane of the side walls and cooperatively associated with said guide slot means at an inner section thereof for severing plant material entering the slot, said blade being movable transversely of the slot, with a bearing member carried by said support and having a pivot projection extending away from said support, said projection having an external pivot bearing surface extending longitudinally thereof and circularly thereabout, a bearing member secured to the outer end of said projection and extending transversely beyond the pivot bearing surface to form spaced thrust bearings adjacent the outer end of the pivot bearing, a blade carrier including spaced annular bearing surfaces facing each other and engageable respectively with said thrust bearing surfaces to maintain said cutter blade in said independent plane, and dust tight closure means for enclosing the outer end of said projection and forming a lubricant reservoir for said bearing surfaces.

5. In a cutter of the character described for a harvesting machine, the combination of a supporting member, means providing a plant stalk guide slot defined by side walls disposed in a common plane converging toward one another from an outer and forward place to an inner and rearward place and a cutting blade disposed in an independent plane adjacent the plane of the side walls cooperatively associated with said slot means and movable in a plane transverse to said slot for cutting plant stalks entering said slot, with a pivot bearing member secured to and projecting outwardly from said supporting member and including an annular external pivot bearing and an annular shoulder disposed at angles less than a straight angle to one another, said bearing and shoulder having a common axis, a blade carrier having a bearing surface corresponding to said external pivot bearing surface and pivotally mounted on said pivot bearing member, an annular bearing member carried by said pivot bearing member in spaced and substantially opposed relation to the said annular shoulder, said annular bearing member having first and second thrust bearing surfaces, said first bearing surface shaped to be engaged by the bearing surface on said blade carrier and a combined cover and lubricant reservoir secured to said blade carrier and covering the outboard end of said pivot bearing member and having a bearing surface shaped to engage the second thrust bearing surface on said annular member to positively maintain said cutter blade in said independent plane.

6. In a cutter of the character described for a harvesting machine, the combination of a supporting member, means providing a plant stalk guide slot defined by side walls in a common plane converging toward one another from an outer and forward place to an inner and rearward place and a cutting blade in a plane independent of the plane of the side walls cooperatively associated with said slot means and movable in a plane transverse to said slot for cutting plant stalks disposed in said slot, with a bearing member secured to said supporting member and having a circular bearing surface thereon about an axis at an angle less than a straight angle to said transverse plane, a blade carrier mounted on said bearing member and having a bearing surface cooperative with said circular bearing surface, means for securing said blade to said carrier for movement therewith, a second bearing surface formed on said carrier, a thrust bearing member carried by the first said bearing member and having thrust bearing engagement with said second bearing surface to maintain said cutting blade in its plane, and sealing means operatively associated with said bearing surfaces to prevent the entrance of dirt thereto.

7. In a cutter of the character described for a harvesting machine, the combination of a supporting member including a stationary cutter in a fixed plane and a movable cutter blade in a fixed plane independent of the plane of the stationary cutter, with a pivot bearing member secured to the supporting member, a blade carrier pivoted upon said pivot bearing member for swinging movements thereabout, means for retaining said carrier against substantial movements axially of said pivot bearing member to maintain said movable cutter blade in said independent plane, and means for supplying lubricant substantially continuously to the bearing members.

8. In a cutter of the character described for a harvesting machine, the combination of a supporting member, a pair of stationary shear blades in a common plane inclined to the horizontal, and a movable cutter blade disposed in an independent plane adjacent the plane of the shear blades cooperative with said stationary blades and mounted beneath the same, with a downwardly directed pivot bearing member secured to the supporting member, a blade carrier including a ring collar pivoted upon said pivot bearing member for swinging movements thereabout, upper and lower thrust bearing means for retaining said carrier collar against substantial movements axially of said pivot bearing member to positively maintain said cutter blade in said plane, means adjacent to the lower thrust bearing means for supplying lubricant substantially continuously to the bearing surfaces between said collar and pivot bearing member and between said collar and thrust bearing means, and means between said collar and the supporting member for sealing the joint therebetween against the entry of dirt.

9. In a cutter mechanism for harvesting machines, a pair of stationary blades in a common plane mounted in spaced relation to one another and having adjacent edges shaped to define a slot between said blades for receiving plant stalks and the like, a relatively movable cutting blade in a plane immediately adjacent to and independent of the plane of the stationary blades having cutting edges on opposite sides thereof, means for pivotally mounting said cutting blade for movement in said independent plane to have said cutting edges cooperatively associated with said stationary blades for cutting material received in said slot, and means for swinging said cutting balde in an arc across said slot about its pivotal mounting to effect a combined shearing and slicing action of the stalks.

10. In a cutter mechanism for harvesting machines, a pair of stationary blades in a common plane having adjacent edges defining a slot for receiving a plant stalk, a relatively movable cutting blade in an independent plane in side by side relation with the stationary blades having cutting edges on opposite sides thereof cooperatively associated with said stationary blades for cutting material disposed between said cutting and said adjacent edges, a pivoted blade carrier for supporting and swinging said movable cutting blade in an arc across said slot to slice and shear said stalk, and means engageable with said blade carrier to positively position said movable blade in its independent plane whereby to minimize wear between said blades by rubbing action of the blades.

11. In a cutter mechanism for harvesting machines, a pair of stationary blades in a common plane positioned to define a slot for receiving a stalk, a relatively movable cutting blade in an independent plane in side by side relation with the stationary blade having cutting edges cooperatively associated with said stationary blades for cutting material received in said slot, a pivoted blade carrier for supporting and swinging said movable cutting blade in an arc across said slot to slice and shear said stalk, means for securing said blade to said carrier permitting adjustment of the plane of the blade toward and away from the plane of the stationary blades, and means engageable with opposite sides of said blade carrier to positively position said movable blade for movement in said independent plane.

12. In a cutter mechanism for harvesting machines, a pair of stationary blades in a common plane in spaced relation to define a slot for receiving a plant stalk, a relatively movable cutting blade in an independent plane below said plane of the stationary blades and in side by side relation with the stationary blades, a blade carrier for supporting said blade for movement in said independent plane, means for pivotally mounting said carrier, means engageable with said blade carrier for preventing axial movement of the carrier relative to the pivotal mounting to positively maintain said blade in said independent plane and adjustable means for securing said blade to said carrier permitting movement of the plane of the blade toward and away from said plane of the stationary blades.

CARL E. SWENSON.

REFERENCES CITED

The following references are of record in the file of this patent:

UNITED STATES PATENTS

| Number | Name | Date |
|---|---|---|
| 856,940 | Cady | June 11, 1907 |
| 1,891,964 | Svendsgaard | Dec. 20, 1942 |
| 2,212,057 | Waller | Aug. 20, 1940 |

FOREIGN PATENTS

| Number | Country | Date |
|---|---|---|
| 18,290 | Great Britain | Oct. 12, 1892 |